July 16, 1935.  W. KIESER  2,008,506
ALTERNATING CURRENT DISTRIBUTION SYSTEM
Filed Jan. 10, 1933
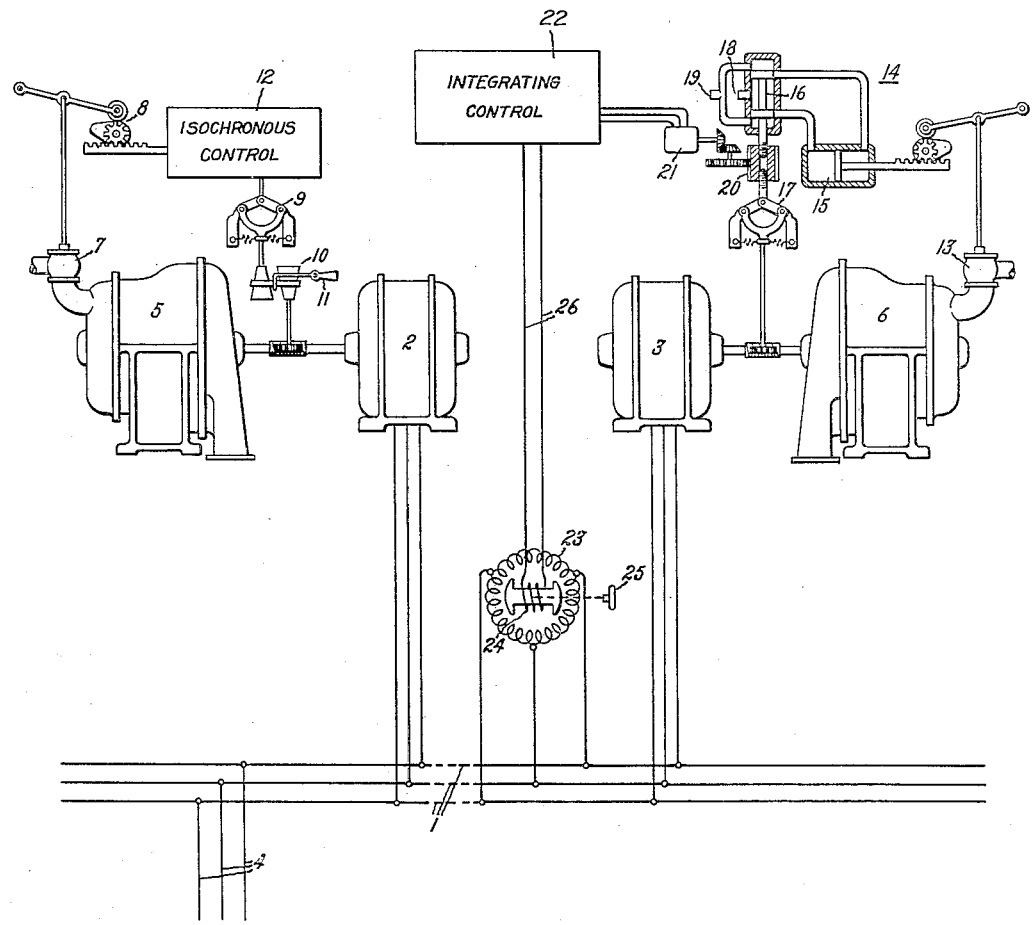
Inventor:
Walter Kieser,
by Charles R. Tullar
His Attorney.

Patented July 16, 1935

2,008,506

UNITED STATES PATENT OFFICE 2,008,506

ALTERNATING CURRENT DISTRIBUTION SYSTEM

Walter Kieser, Berlin-Charlottenburg, Germany, assignor to General Electric Company, a corporation of New York Application January 10, 1933, Serial No. 651,042
In Germany February 18, 1932

1 Claim. (Cl. 290—4)

My invention relates to alternating current distribution systems and more particularly to frequency control and load division control in alternating current distribution systems having a plurality of parallel connected alternating current generators.

The frequency of, and the division of load between, parallel connected synchronous generators are usually controlled by the setting of their prime mover speed governors. Speed governors which are virtually isochronous are known in the art. However, as a practical matter, alternating current generators will not operate in parallel with such governors because distribution of load between them is indeterminate. Speed governors which regulate the average or integrated speed or frequency are also known in the art. These governors require master clocks, or equivalent reference standards, and consequently it is sometimes difficult to operate alternating current generators with separate governors of this type in parallel because of the difficulty of making two master clocks with sufficiently identical time keeping characteristics.

In accordance with my invention I operate two parallel connected synchronous generators with isochronous and integrating speed or frequency control, respectively. This has a number of advantages. Thus, when a load change occurs the isochronously controlled governor acts relatively quickly and tends to minimize the accumulation of an integrated frequency error. Consequently the system frequency returns to normal more quickly than when only average frequency type control is employed. In addition, both generators tend to share the load change so that the value of the load change which can be handled by the system without overloading one generator is greater than the rating of either generator alone. Thus, with my system, integrating type frequency control with improved sharing of load can be had with two widely separated synchronous generators with the use of but one master clock and without the use of auxiliary control circuits between the two machines.

An object of my invention is to provide a new and improved electrical distribution system.

Another object of my invention is to provide a new and improved system for controlling the frequency and distribution of load between parallel connected synchronous generators.

My invention will be better understood from the following description taken in connection with the accompanying drawing and its scope will be pointed out in the appended claim.

Referring now to the accompanying drawing, I have shown therein an alternating current distribution system comprising a power circuit 1 to which are connected a plurality of synchronous generators 2 and 3. Also connected to circuit 1 is a variable load circuit 4. Generators 2 and 3 are connected to be driven by any suitable prime movers, such as by the steam turbines 5 and 6, which are illustrated.

Turbine 5 is provided with a steam inlet valve 7 and any suitable controlling means 8 for opening and shutting the valve. Turbine 5 is also provided with a conventional centrifugal speed governing means 9, which is driven from the turbine shaft through a suitable variable speed ratio drive 10 of any suitable type, which is shown as consisting of a belt and cone pulleys. A pivoted lever 11 is provided for shifting the belt and thereby varying the speed ratio between the turbine shaft and the centrifugal governor.

Interposed between governor 9 and the valve controlling mechanism 8 is an isochronous type speed controlling or regulating means 12, which may be of any of the types well known in the art, and the details of which form no part of my present invention. One such control is illustrated and described in Patent No. 1,629,318, granted May 17, 1927, on an application of R. G. Standerwick, and assigned to the assignee of the present application. Broadly speaking, the isochronous controlling mechanism produces such an adjustment between the governor 9 and the valve controlling mechanism 8 that the instantaneous speed of the turbine 5 is always constant for any setting of handle 11, with the exception of very short duration departures from this instantaneous speed when the load on the generator 2 changes. With valve controlling mechanism 8 connected directly to centrifugal governor 9 in the ordinary manner, a drooping speed characteristic would be produced in which the speed of the turbine 5 would be decreased as the load on it increased so that there would be a different value of instantaneous speed for every different value of load.

In connection with the use of the term "isochronous" it is pointed out that strictly speaking an isochronous governor is an ideal or perfect governor and the true action of such a governor cannot be obtained in practice. I, therefore, employ the term isochronous governor or controlling means to mean a governor or controlling means which maintains the instantaneous speed constant, with the exception of temporary short changes in instantaneous speed due to changes in load.

Turbine 6 is provided with a steam inlet valve 13 whose position is controlled by any suitable valve controlling means, such as the means 14 which is illustrated. As shown, this means 14 comprises apparatus consisting of an oil cylinder and piston combination 15 which is controlled by a pilot valve 16, which in turn is controlled by a centrifugal governor mechanism 17 connected to respond to the speed of turbine 6. Valve 16 has an oil pressure inlet 18 and an oil outlet 19.

The action of such a speed governing arrangement is well known. Briefly speaking, it is such that if the speed of turbine 6 increases the centrifugal governor 17 acts to lower the pilot valve 16 thereby admitting oil to the left hand portion of cylinder 15 and operating the valve controlling mechanism 14 in a manner to reduce the opening of steam valve 13. Similarly, if the speed of turbine 6 decreases valve 16 is raised, thereby allowing oil to flow into the opposite end of cylinder 15 and cause a reverse motion of the valve controlling mechanism 14 in a manner to increase the opening of the steam inlet valve 13.

Any suitable adjusting means between the valve 16 and the governor 17 may be employed for the purpose of varying the governor setting. As shown, I have illustrated a means comprising a nut 20 in which the valve 16 and the controlling member of the governor 17 are threaded. By turning this nut the relative positions of the two members threaded therein may be varied. Nut 20 is geared to a reversible pilot motor 21, so that by controlling the direction of operation of this motor the setting of the speed governing means for turbine 6 may be controlled.

For the purpose of controlling the speed governing means of turbine 6 I provide a speed or frequency controlling means of the average or integrating type, and as its details form no part of the present invention, it has been designated generally by the box 22. One such type of integrating regulator which I may employ, and which is the one which is at present preferred, is disclosed and claimed in an application of Henry E. Warren, Serial No. 447,037, filed April 24, 1930. In the Warren regulator an ordinary drooping characteristic governor has its speed setting controlled by a master clock regulated time error responsive mechanism.

Broadly speaking, all integrating type regulators contain a master clock or other reference standard, with which is compared the speed or frequency of the regulated apparatus. For purposes of adjusting the setting of such a regulator, I have illustrated a phase shifting arrangement comprising a stator winding 23, energized from main circuit 1 and arranged to produce a rotating field, with which is associated a secondary member 24, the position of which may be controlled by a handle 25. The voltage induced in secondary member 24 is transferred by means of a circuit 26 to the integrating control 22 wherein it is used to operate any suitable device, such as a small synchronous motor, for giving a speed which is proportional to the speed of the device which is to be regulated, in this case the generator 3 and turbine 6. By turning handle 25 the winding 24 may be advanced or retarded in phase with respect to the rotating field produced by winding 23 and thus the integrating regulating means may be made to respond in the same manner as if the actual speed or frequency of the generator 3 or circuit 1 had been advanced or retarded.

The operation of my invention is as follows: Assume that generators 2 and 3 are being operated by their respective turbines 5 and 6, and that they are sharing the load substantially equally and are operating at a normal speed or frequency and that there is no integrated speed or frequency error which needs correction. If now the load increases, the speed of both the turbo-generator sets will be momentarily reduced. This will cause the isochronous control for turbine 5 to open steam valve 7 so as to bring the turbine 5 up to normal speed again. At the same time, the reduction in speed will result in an integrated or accumulated error so that the integrating control will act also to restore the speed to normal. If the integrating control is of the type which is described and claimed in the above identified Warren application it will not attempt to make up for and cancel the accumulated error at once, but will permit a relatively small and insignificant accumulated error to persist so as to allow a subsequent reverse load change which would act inherently to cancel it. In either case, however, the isochronous control will act relatively quickly to restore the frequency with each load change and the integrating control will act whenever the time error or integrated frequency deviation exceeds the predetermined sensitivity setting. Consequently, as both turbo-generator sets act simultaneously to restore the frequency or speed to normal, this restoration will take place more rapidly than if the entire burden of restoring the frequency were always placed upon one of the sets. In addition, the fact that both types of control act concurrently results in a sharing of the load increase by the sets. Consequently, load increases on the system can be greater than the rating of the generator 3 without adversely affecting the regulation of the speed or frequency because as both machines share the load increase, part of each load increase will be carried by generator 2. This is in contrast to the usual integrating frequency control system in which some generators are on drooping governor characteristic type control. In such systems all load changes must be carried by the machines under the direct control of the integrating regulators.

The reason that the system is stable with respect to load distribution between the machines is due to the regulating characteristics of isochronous and integrating controllers. Thus in the interest of reasonable cost and prevention of unnecessary operation isochronous controllers are not made too sensitive. Also, in the interest of maintaining practically uniform system frequency, integrating controllers have a definitely limited speed of operation, or in other words, their effect on the speed setting of their associated speed governors is such as to cause relatively slight changes in their setting so that integrated errors are corrected for by relatively slight increases or decreases in speed. As a result of the above specified characteristics of these two types of controllers the integrating type speed controller varies the setting of its associated governor within the limits of sensitivity of the isochronous controller. If this does not happen to be the case in any system the governors should be adjusted so that this is true. For example, if the isochronous controller is set to hold 60 cycles per second within a tolerance or limit of insensitivity of plus or minus .01 of a cycle per second and if the integrating controller is sensitive to, or set to respond to, a time error of plus or minus one second, then the change in setting of the speed governor produced by the integrating control should be such as to produce a speed change which is less than plus or minus .01 of a cycle per second. With such relative settings of the controllers the integrating controller may speed up or slow down its associated machine so as to correct for integrated time error without disturbing the isochronous control.

While I have illustrated but a single turbo-generator set under the control of an integrating regulating means, it should be obvious to those skilled in the art that my invention is not so limited, and that as many parallel generators as desired may be controlled from a single master integrating type control if desired. However, this in no way affects the principle of operation of my invention in which the interaction of the isochronously controlled machine and the integrating type controlled machine produces improved and beneficial results. Similarly, more than one machine can be under isochronous control, provided they can be made to operate properly in parallel.

By means of the adjusting mechanisms 10 and 11 for the isochronously controlled set or the adjusting mechanism 25 for the integrating controlled set, it is possible to shift the load between the two sets as desired. For example, if lever 11 is temporarily moved to increase or decrease the speed ratio, the turbine 5 will have more or less steam supplied thereto and consequently its generator will act to carry more or less of the total load. Similarly, by moving handle 25 the integrating control will respond just as though a change in frequency had taken place and consequently its associated machine can be made to act to carry more or less load as desired. By again restoring adjusting mechanisms 11 or 25 to their normal position the transfer in load may be stopped and the machines will continue with the new load distribution.

While I have shown and described a particular embodiment of my invention, it will be obvious to those skilled in the art that changes and modifications may be made without departing from my invention, and I therefore aim in the appended claim to cover all such changes and modifications as fall within the true spirit and scope of my invention.

What I claim as new and desire to secure by Letters Patent of the United States, is:—

In combination, a variable load alternating current circuit, a pair of synchronous generators connected in parallel thereto, a separate prime mover for each of said generators, a separate drooping characteristic speed governor for each of said prime movers, and means for maintaining constant integrated frequency on said circuit while permitting said generators to share load changes on said circuit without the use of auxiliary control circuits therebetween comprising an isochronous type speed controller for one governor and an integrating type speed controller for the other governor, said integrating type speed controller being limited to controlling the speed setting of its associated governor within the limits of insensitivity of said isochronous controller.

WALTER KIESER.